United States Patent [19]
Nicol et al.

[11] Patent Number: 5,423,189
[45] Date of Patent: Jun. 13, 1995

[54] CONTROL SYSTEM FOR ABSORPTION HEAT TRANSFER PLANTS

[75] Inventors: Donald V. Nicol; Russell A. Kilbourn; Mark J. Lane, all of Richardson, Tex.

[73] Assignee: Gas Research Institute, Chicago, Ill.

[21] Appl. No.: 154,711

[22] Filed: Nov. 18, 1993

Related U.S. Application Data

[63] Continuation-in-part of Ser. No. 995,069, Dec. 22, 1992, Pat. No. 5,315,839.

[51] Int. Cl.$^6$ ............................................. F25B 15/00
[52] U.S. Cl. ........................................ 62/141; 62/148
[58] Field of Search ..................... 62/141, 476, 148

[56] References Cited

U.S. PATENT DOCUMENTS

| | | | |
|---|---|---|---|
| 2,502,104 | 3/1950 | Reid | 62/148 |
| 2,940,274 | 6/1960 | McGrath | 62/141 |
| 2,948,124 | 8/1960 | Embury | 62/141 |
| 3,005,318 | 10/1961 | Miner | 62/141 |
| 3,122,002 | 2/1964 | Miner et al. | 62/141 |
| 3,225,556 | 12/1965 | Rohrs | 62/141 |
| 3,254,499 | 6/1966 | Hopkins | 62/148 |
| 3,410,104 | 11/1968 | Hopkins | 62/148 |
| 4,100,756 | 7/1978 | Albertson | 62/2 |
| 4,269,034 | 5/1981 | Rzechula | 62/141 |

Primary Examiner—Henry A. Bennet
Assistant Examiner—William C. Doerrler
Attorney, Agent, or Firm—John M. Cone; William L. Clayborn

[57] ABSTRACT

A control system for an absorption heat transfer plant controls the quantity of heat input into the plant's concentrator in response to the plant's evaporator liquid refrigerant temperature. The control system also controls the temperature of the cooling fluid for the plant's absorber and condenser.

2 Claims, 1 Drawing Sheet

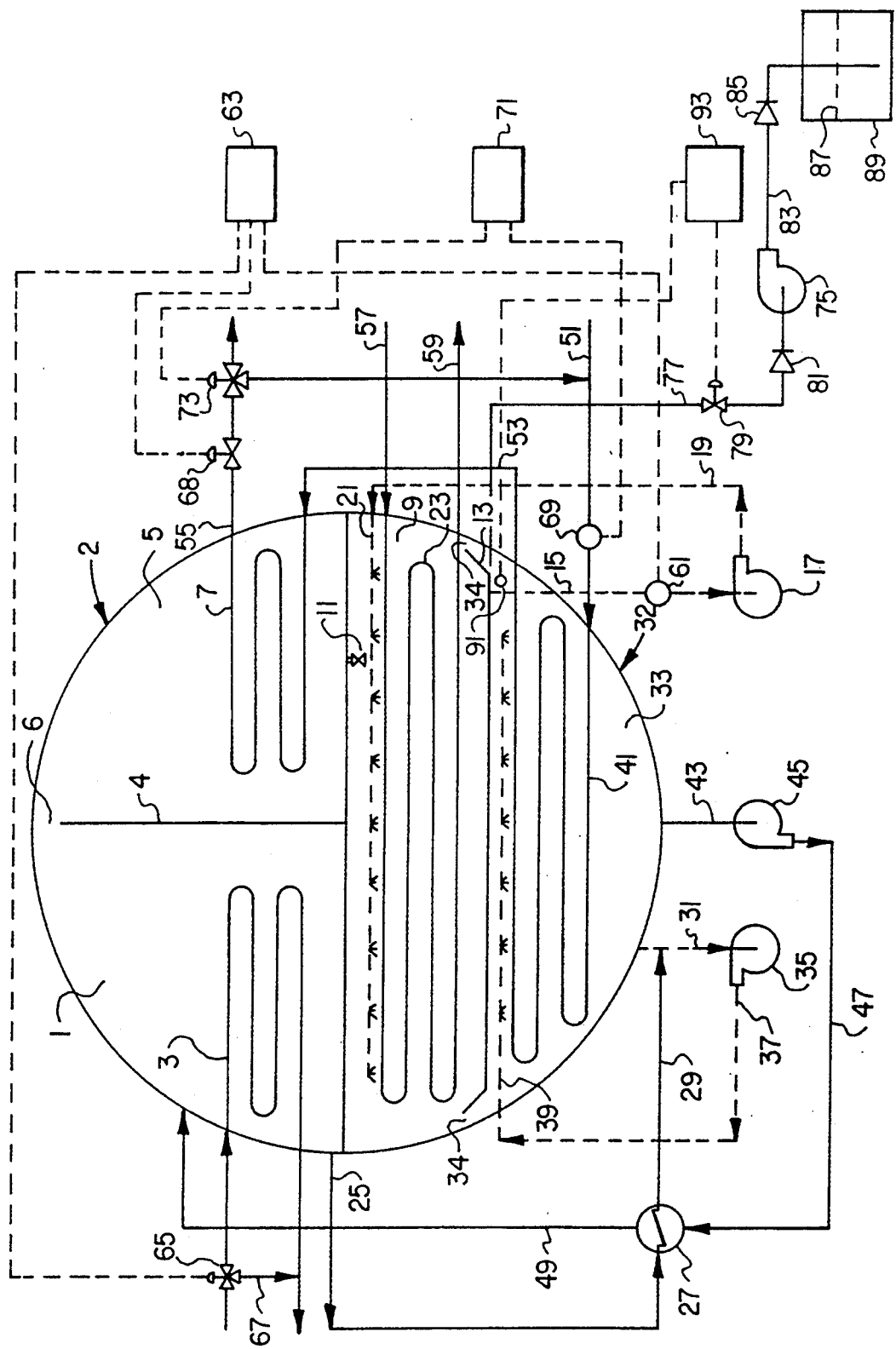

CONTROL SYSTEM FOR ABSORPTION HEAT TRANSFER PLANTS

This application is a continuation-in-part of U.S. patent application Ser. No. 07/995,069, filed Dec. 22, 1992, now U.S. Pat. No. 5,315,839.

BACKGROUND OF THE INVENTION

The present invention relates to absorption heat transfer plants and in particular to a control system therefor.

Absorption refrigeration plants are well known in the refrigeration art and have been used in a wide variety of refrigeration applications. Examples of such plants are those using water as a refrigerant and those using ammonia as a refrigerant.

An absorption refrigeration plant comprises a concentrator, a condenser, an evaporator, and an absorber. In the concentrator, a dilute solution of absorbent and refrigerant is heated, thereby releasing refrigerant. The refrigerant vapor flows to the condenser, where the vapor is cooled and thereby condensed. From the condenser, the liquid refrigerant flows through an orifice into the evaporator. The evaporator is at a lower pressure than the condenser, thus a portion of the liquid refrigerant vaporizes, cooling the remaining liquid. The cooled liquid refrigerant cools the system fluid by direct heat transfer, which causes additional liquid refrigerant to vaporize. The cooled system fluid is used to cool an external refrigeration load. The refrigerant vapor flows to the absorber, where the vapor is absorbed by a relatively undiluted solution of absorbent and refrigerant, which dilutes the solution. The dilute solution is then pumped to the concentrator, completing the cycle.

A refrigeration absorption plant is generally subjected to a variable refrigeration load and variable external conditions, such as ambient air temperature. An automatic control system is generally provided to accomplish stable, efficient operation of the plant.

An additional consideration in absorption refrigeration plants which use water as a refrigerant is that if the refrigerant is allowed to freeze, the operation of the plant will be disrupted and the plant possibly damaged. The lowest temperature liquid refrigerant occurs in the evaporator. Thus, in the past, such plants were designed to maintain the temperature of the liquid refrigerant in the evaporator substantially above 32° F. (generally between 40° and 42° F.) at full capacity to provide a safety margin against freezing the refrigerant.

Another consideration in absorption refrigeration plants which use water as a refrigerant arises due to the fact that to operate at optimum efficiency, the interior of such plants must be maintained at very low pressures, typically approximately 1 psia or below. Due to leakage and other causes, the pressure inside such plants tends to increase above optimum. A vacuum pump is used to return the plant's internal pressure to optimum. In the past, the process of pumping the internal pressure down to the optimum level was controlled manually. That is, a worker positioned several valves and turned on the vacuum pump, then reversed the process when the plant's internal pressure was within limits.

U.S. Pat. No. 4,505,123 (Kusakabe et al) discloses a control system in which the rate of flow of liquid refrigerant from the condenser to the evaporator is controlled in response to any of the following:

1. the temperature of the heat supplied to the concentrator,
2. the temperature of the liquid refrigerant entering the evaporator,
3. the temperature of the solution of absorbent and refrigerant, or
4. the pressure of the refrigerant vapor in the absorber.

U.S. Pat. No. 4,706,464 (Kreutmair) discloses a control system in which the heat supplied to the concentrator is controlled in response to the temperature of the refrigerant vapor leaving the concentrator and the flow of liquid refrigerant from the condenser to the evaporator is controlled in response to the temperature of the refrigerant vapors at the outlet of the evaporator.

U.S. Pat. No. 4,894,988 (Kaneko et al) discloses a control system in which liquid refrigerant in the condenser may be diverted directly to the absorber when the temperature of cooled system water leaving the evaporator decreases below a preset temperature.

The Trane Company of La Crosse, Wis., manufactures an absorption refrigeration machine in which an electro-pneumatic control system controls the heat supplied to the concentrator in response to the temperature of the system fluid, the fluid which cools an external load. The Trane control system also controls the heat supplied to the concentrator in response to the temperature of a fluid which is used to cool the machine's absorber and condenser. The Trane control system is described in Operation-Maintenance Manual, Trane Company, La Crosse, Wis., 1983.

SUMMARY OF THE INVENTION

An object of the present invention is to provide a novel automatic control system for an absorption heat transfer plant which causes the plant to respond rapidly and accurately to variations in load and external conditions. A further object is to provide a control system which may be installed on existing plants without the need to disassemble the plants. A further object of the invention is to provide a means for automatically maintaining the internal pressure of the plant at the optimum level.

The present invention provides a control system for an absorption heat transfer plant comprising means for controlling the supply of heat to the concentrator responsive to the temperature of the evaporator liquid refrigerant. The invention also provides means for controlling the temperature of a cooling fluid which cools the heat transfer plant's absorber and condenser, which control means maintains the cooling fluid at an optimum temperature as the cooling fluid enters the absorber.

Advantageously, the control system causes the plant to respond rapidly and accurately to variations in load and external conditions, thereby achieving efficient, stable, and safe operation of the plant. A further advantage of the invention is that the control system may be installed on an existing plant without the need to disassemble the plant. In the case of plants which use water as a refrigerant, a further advantage is that the invention allows the plant to be operated at full capacity with a smaller safety margin for the evaporator liquid refrigerant temperature than was previously the case.

BRIEF DESCRIPTION OF THE DRAWING

A preferred embodiment of the invention will be described, by way of example only, with reference to the accompanying drawing, in which the sole figure is a schematic diagram of an absorption refrigeration plant having a control system in accordance with the present invention.

DETAILED DESCRIPTION

This embodiment of the invention is used in a system for distilling certain hydrocarbons from a natural gas stream. The refrigerant used is water and the absorbent is lithium bromide, a hygroscopic salt. The fluid which is used to cool an external load is water, as is the fluid which is used to cool the absorber and condenser.

A concentrator 1 and a condenser 5 are portions of an upper vessel 2. The lower portion of the concentrator 1 and the condenser 5 are separated by a partition 4. The upper portion of the concentrator 1 and the condenser 5 are connected by means of an opening 6.

A solution of absorbent and refrigerant (not shown) is heated in the lower portion of the concentrator 1 by hot water or steam from an external source (not shown) flowing through a concentrator heat exchanger 3. As a result, refrigerant vapor (not shown) is released from the solution. The vapor flows through the opening 6 to the condenser 5, where a coolant (not shown) flowing through a condenser heat exchanger 7 causes the vapor to condense. The liquid refrigerant (not shown) collects at the bottom of the condenser 5.

The condenser 5 is located above an evaporator 9. The condenser 5 is connected to the evaporator 9 by means of an expansion valve 11.

The pressure in the evaporator 9 is less than the pressure in the condenser 5. Thus, the liquid refrigerant flows from the condenser 5 to the evaporator 9 through the expansion valve 11. As the liquid refrigerant (not shown) flows through the expansion valve 11, a portion flashes to vapor (not shown), cooling the remaining liquid refrigerant. The remaining liquid refrigerant collects in an evaporator pan 13 and flows through a conduit to the inlet of a pump 17. From the pump 17, the liquid refrigerant flows through a conduit 19 to an evaporator spray bar 21, where it is sprayed over an evaporator heat exchanger 23. The system water (not shown) flowing through the evaporator heat exchanger 23 is warmer than the liquid refrigerant. Thus, additional liquid refrigerant is vaporized and the system water is cooled.

The evaporator 9 and an absorber 33 are portions of a lower vessel 32. The evaporator pan 13 separates the evaporator 9 from the absorber 33, and the evaporator 9 and absorber 33 are connected by means of openings 34.

The absorber 33 is connected to the concentrator 1 by means of a conduit 43, a pump 45, a conduit 47, a heat exchanger 27, and a conduit 49. The absorber 33 is also connected to an absorber spray bar 39 by means of a conduit 31, a pump 35, and another conduit 37. The concentrator 1 is connected the absorber 33 by means of a conduit 25, the heat exchanger 27, another conduit 29 which joins the conduit 31, the pump 35, the conduit 37, and the absorber spray bar 39.

When refrigerant vapor is released from the absorbent-refrigerant solution in the concentrator 1, as described above, the solution in the concentrator 1 is concentrated. The concentrated absorbent-refrigerant solution flows from the bottom of the concentrator 1, through the conduit 25, to the solution heat exchanger 27. From the solution heat exchanger 27, the concentrated solution flows through the conduit 29 into the conduit 31, where it mixes with dilute absorbent-refrigerant solution from the bottom of the absorber 33. The conduit 31 carries the solution mixture to the inlet of the pump 35. From the pump 35, the solution mixture flows through the conduit 37 to the absorber spray bar 39 which sprays the solution mixture into the absorber 33. The solution mixture spray absorbs refrigerant vapor which flows from the evaporator 9 to the absorber 33 through the openings 34. As a result, the solution mixture is further diluted. The heat of dilution is removed by a coolant flowing through an absorber heat exchanger 41.

A conduit 43 carries dilute absorbent-refrigerant solution from the bottom of the absorber 33 to the inlet of the pump 45. From the pump 45, the solution flows through the conduit 47 to the solution heat exchanger 27, where the dilute solution absorbs heat from the relatively hot concentrated solution. From the solution heat exchanger 27, the diluted solution flows through the conduit 49 to the concentrator 1, thus completing the refrigeration cycle.

The coolant for the absorber heat exchanger 41 and the condenser heat exchanger 7 is cooled in an external cooling tower (not shown). The coolant flows from the cooling tower through a conduit 51, the absorber heat exchanger 41, another conduit 53, the condenser heat exchanger 7, another conduit 55, and back to the cooling tower.

The system water is used to cool an external load (not shown). Warm system water from the outlet of the external load flows through a conduit 57 to the evaporator heat exchanger 23. As previously described, while flowing through the evaporator heat exchanger, the system water is cooled by the relatively cool liquid refrigerant. The cooled system water is carried to the inlet of the external load by a conduit 59.

An electrical remote temperature transmitter 61 is disposed in the conduit 15 through which the evaporator liquid refrigerant flows. The remote temperature transmitter 61 provides an electrical signal to a digital controller 63. In response to that signal, the controller 63 controls the position of an electrically-actuated three-way valve 65. When the evaporator liquid refrigerant temperature falls below a preset desired temperature, the controller 63 positions the valve 65 to direct a portion of the externally-supplied hot water or steam through a conduit 67, thus bypassing the concentrator heat exchanger 3. As less heat is supplied to the concentrator heat exchanger 3, less refrigerant vapor is released from the absorber-refrigerant solution, which decreases the cooling capacity of the evaporator 9. As a result, the temperature of the liquid refrigerant in the evaporator 9 increases. Conversely, when the evaporator liquid refrigerant temperature increases above the desired temperature, the controller 63 positions the valve 65 to bypass less hot water or steam. As a result, the cooling capacity of the evaporator 9 increases and the temperature of the evaporator liquid refrigerant decreases. The controller 63 also controls the position of an electrically-actuated valve 68 disposed in the conduit 55 through which coolant flows from the condenser heat exchanger 7 to the cooling tower (not shown). When evaporator liquid refrigerant temperature drops below the desired temperature, thee controller 63 positions the valve 68 to restrict the flow of coolant. This causes the temperature of the coolant in the condenser heat exchanger 7 to increase, which decreases the amount of liquid refrigerant supplied to the evaporator 9 through the expansion valve 11. As a result, less cooling takes place in the evaporator, which causes the evaporator liquid refrigerant temperature to rise. Conversely, when the evaporator liquid refrigerant temperature rises above the desired temperature, the controller 63 positions the valve 55 to increase the flow of coolant. This increases cooling in the evaporator, thereby decreasing the evaporator liquid refrigerant temperature.

The temperature transmitter 61, controller 63, and valves 65, 68 act to maintain the evaporator liquid refrigerant temperature at a constant value. Acting together, they respond quickly to changes in load and in environmental conditions, thus allowing the desired evaporator liquid refrigerant temperature to be set nearer to the freezing point of the refrigerant than was previously possible.

A remote temperature transmitter 69 is disposed in the conduit 51 to sense the temperature of the coolant entering the absorber heat exchanger 41. The remote temperature transmitter 69, a digital controller 71, and an electrically-actuated three way valve 73 act together to maintain the temperature of the coolant entering the absorber heat exchanger 41 constant at a preset desired temperature, which contributes to the stability and efficiency of the plant. When the coolant temperature drops below the desired temperature, the controller 71 positions the valve 73 to direct a portion of the coolant exiting the condenser heat exchanger 7 through the conduit 55 to the conduit 51 and thence to the absorber heat exchanger 41, thereby bypassing the cooling tower (not shown). As a result, the bypassed coolant is not cooled in the cooling tower, which causes the coolant temperature to increase. When the coolant temperature increases above the desired temperature, the controller 63 positions the valve 73 to bypass less coolant, which decreases the coolant temperature.

In practice, this embodiment of the invention has demonstrated the ability to maintain the evaporator liquid refrigerant temperature within $\frac{1}{2}°$ F. of the desired value.

The absorption heat transfer plant in this embodiment of the invention operates at very low internal pressures, i.e., nominally 0.122 psia in the absorber 33 and 1.227 psia in the condenser 5. To maintain a high level of efficiency, the upper and lower vessels 2, 32 must be purged periodically by a vacuum pump. In the past, such purging was controlled manually, which required that a maintenance person periodically visit the plant. In this embodiment of the invention, a vacuum pump 75 is connected to the interior of the absorber 33 by a conduit 77. The conduit 77 enters the absorber 33 at a point above the level of the lithium bromide-water solution (not shown) within the absorber 33. An electrically-controlled valve 79 and a check valve 81 are disposed in the conduit 77 between the absorber 33 and the vacuum pump 75. The check valve 81 prevents entry of outside air into the absorber 33. A second conduit 83 having a check valve 85 conveys the exhaust of the vacuum pump 75 to a point below the surface 87 of a quantity of water in a water glass 89.

An electrical remote pressure transmitter 91 is disposed above the solution level in the absorber 33. The pressure transmitter 91 provides a signal to a controller 93. When the pressure within the absorber 33 rises above a preset level, the controller 93, in response to the signal from the pressure transmitter 91, performs the following routine:
1. run the vacuum pump 75 for 15 minutes to evacuate the conduit 77 between the pump 75 and the valve 79;
2. open the valve 79;
3. run the vacuum pump 75 until the pressure within the absorber 33 pressure reaches a preset level which is below that which initiated the routine;
4. close the valve 79; and
5. turn off the vacuum pump 75.

It will be appreciated that purging the absorber 33 purges the entire lower chamber 32 and also the upper chamber 2 through the expansion valve 11.

While the controller 93 in this embodiment is responsive to the pressure transmitter 91, it will be appreciated that other schemes may be used. For example, the controller 93 can be a simple timer which performs steps 1, 2, 4, and 5 at regular intervals, i.e., daily, weekly, monthly, etc. In any event, regular purging assists in maintaining optimum plant efficiency.

While a preferred embodiment of the invention has been shown and described, it will be apparent to those skilled in this art that various modifications may be made to this embodiment without departing from the spirit of the present invention. For that reason, the scope of the invention is set forth in the following claims.

We claim:
1. An absorption heat transfer plant comprising:
    a concentrator, a condenser, an evaporator, and an absorber, all connected in a closed, continuous-cycle circuit, said circuit containing an absorbent and a refrigerant;
    a heat exchanger disposed in said concentrator, said concentrator heat exchanger including an inlet and an outlet for connection to an external source of heating fluid;
    a series combination including a heat exchanger disposed in said condenser and a heat exchanger disposed in said absorber, said series combination including an inlet and an outlet for connection to an external source of cooling fluid; and
    a control system for regulating the quantity of heat supplied to said concentrator heat exchanger by said external source and for regulating the flow of cooling fluid through said series combination, said control system being responsive to an evaporator liquid refrigerant temperature.
2. The plant of claim 1 further comprising:
    a bypass path connected between said series combination inlet and outlet;
    a bypass control system for regulating the flow cooling fluid through said bypass path, said bypass control system being responsive to a cooling fluid temperature.

* * * * *